United States Patent Office 3,041,189
Patented June 26, 1962

3,041,189
PRODUCTION OF CERAMIC MATERIAL
John Martin Herbert, Horton, England, assignor to The Plessey Company Limited, Ilford, England, a British company
No Drawing. Filed Sept. 29, 1958, Ser. No. 763,841
Claims priority, application Great Britain Oct. 3, 1957
5 Claims. (Cl. 106—39)

This invention relates to the production of ceramic materials and to new compositions of such materials.

In our co-pending U.S. patent applications Nos. 542,478, now abandoned and 582,945, now U.S. Patent 2,946,937, we have described a ceramic material and a method of producing it, the material having a high permittivity and suitable for use as a dielectric material. The invention of the first-mentioned of these two co-pending applications lies in the production of a capacitor having a base metal electrode and a barium titanate dielectric both of which are capable of being fired simultaneously without degradation of either. A reducing firing atmosphere is used. The second of the applications, now Patent No. 2,946,937, relates to the production of a dielectric sintered body of barium titanate with manganous oxide additions by the sintering of a suitable mixture of these ingredients in a reducing atmosphere. This patent claims a method of producing a dielectric sintered body, which comprises shaping the body of a material which at least after sintering consists essentially of barium titanate and a smaller molecular quantity of manganous oxide, the amount of manganous oxide being at least approximately 14 mol. percent of the composition as a whole, and sintering said body in a reducing atmosphere to give a body which comprises barium titanate and manganous oxide in a proportion corresponding to a formula selected from the group consisting of $$MnO(BaTiO_3)_2$$

$MnO(BaTiO_3)_4$ and $MnO(BaTiO_3)_6$. The present invention is concerned with improvements in and modifications of the material and process described in our prior applications.

In accordance with the present invention, if the manganous oxide is partly, but not wholly, replaced by magnesium oxide useful properties can be obtained with a total proportion of oxides as low as 0.02 gram mol. When the manganese is partly replaced in this way the proportion of the manganous oxide with respect to the barium titanate can be as low as .01 mol. with a probable lower limit of .003 mol.

In a composition involving barium titanate and manganous oxide, and prepared by firing at a high temperature, it seems possible that the oxygen lattice in barium titanate can lose a small proportion of its ions at high temperatures without any great change in structure. There must, however, be a corresponding loss of positive charge and this occurs by conversion of Ti4+ to Ti3+ with an accompanying increase of electrical conductivity. We consider it likely that the manganese replaces some Ti4+ by Mn2+ ions and thus causes the necessary reduction in positive charge without the formation of Ti3+. The higher the firing temperature the greater the loss of oxygen and the more manganese is required to maintain neutrality. In accord with this we find that the conductivity increases as the manganese is diminished at any given firing temperature and it also increases with firing temperature when the manganese content is kept constant.

It is convenient to express the results in terms of the resistance capacity product, which is independent of the dimensions of the specimen and, if the units taken are megohms and microfarads, is measured in seconds. The product is of the values measured at room temperature. The following results are typical:

TABLE 1

*Ceramics Fired at 1200° C.*

*Leakage at Room Temperature*

| Molecules of Manganese Oxide per Molecule of Barium Titanate | Resistance Capacity Product (Seconds) |
|---|---|
| 0.25 | 500 |
| 0.11 | 100 |
| 0.022 | 2 |
| 0.002 | 0.01 |

TABLE 2

*Ceramics Containing 0.022 Mole Manganese and 0.22 Mole Magnesium Oxides Per Mole of Barium Titanate*

| Firing Temperature, ° C. | Resistance Capacity Product (Seconds) |
|---|---|
| 1,200 | 500 |
| 1,250 | 100 |
| 1,300 | 1.0 |
| 1,350 | 0.1 |

As well as the fall in resistivity with firing temperature, Table 2, shows that magnesium enables higher resistivities to be obtained with lower manganese contents.

The limiting value of resistance-capacitance product which can be regarded as satisfactory for a capacitor is generally arbitrary, but 1000 secs. can be considered as good, 100 secs. is satisfactory for many purposes; materials giving a product of 10 secs. or less can be used in special circumstances.

In the preparation of the material it has been found advantageous, in producing dielectrics of the highest resistivity, to expose the material to air for a short time during the pre-firing process when the temperature is above 1000° C.

Some typical compositions in accordance with the invention are given below the proportions being in parts by weight.

EXAMPLES

|  | I | II | III | IV |
|---|---|---|---|---|
| Barium Carbonate | 130 | 130 | 130 | 130 |
| Titanium Dioxide | 53.8 | 53.8 | 53.6 | 53.6 |
| Manganese Carbonate | 3.44 | 0.17 | 0.63 | 2.52 |
| Magnesium Carbonate | 12.6 | 13.8 | 7.88 | 6.25 |
| Thorium Nitrate Tetrahydrate |  |  | 0.81 | 0.81 |

In all these examples the mixing, calcining, milling, casting, assembling and sintering is carried out as described in our prior applications referred to. From the foregoing, it can be determined that the mixtures of the four examples provide respectively, for each gram mol of barium titanate, combined manganese and magnesium oxides in the amount of 0.271, 0.212, 0.128, and 0.145 gram mol. The examples also provide respectively for each gram mol of barium titanate, manganese oxide in the amount of .045, .0023, .0083, .033 gram mol.

Some of the principal electrical properties of the compositions of the foregoing examples are listed below.

EXAMPLES

|  | I | II | III | IV |
|---|---|---|---|---|
| R.C. Product at 150° C., sec | 3 | 0.05 | 5 | 5 |
| Curie Point, C. | 70 | 83 | 53 | 44 |
| Permittivity at Room Temp. | 3,000 | 3,200 | 3,000 | 2,700 |
| Permittivity at Curie Point | 4,400 | 4,500 | 4,700 | 2,950 |

The electrodes can be provided as described, but an electrode of 20 parts by weight of molybdenum and 80 parts nickel can be used; this electrode is non-magnetic.

What I claim is:

1. A dielectric body constituting the product resulting from the firing of a powdered mixture in a reducing atmosphere at temperature within the range of 1200° C. to 1350° C., said product consisting essentially of manganous oxide, magnesium oxide and barium titanate, in the combined total proportion of oxides of between about 0.128 and about 0.27 mol to 1 mol of barium titanate, the proportion of manganous oxide being between about 0.002 and about 0.045 mol to 1 mol of barium titanate.

2. The body of claim 1 wherein the powdered mixture has an initial composition consisting essentially by weight of 130 parts of barium carbonate, 53.8 parts titanium dioxide, 3.44 parts manganese carbonate, and 12.6 parts magnesium carbonate.

3. The body of claim 1 wherein the powdered mixture has an initial composition consisting essentially by weight of 130 parts barium carbonate, 53.8 parts titanium dioxide. 0.17 part manganese carbonate, and 13.8 parts magnesium carbonate.

4. The body of claim 1 wherein the powdered mixture has an initial composition consisting essentially by weight of 130 parts barium carbonate, 53.6 parts titanium dioxide, 0.63 part manganese carbonate, 7.88 parts magnesium carbonate, and 0.81 part thorium nitrate tetrahydrate.

5. The body of claim 1 wherein the powdered mixture has an initial composition consisting essentially by weight of 130 parts barium carbonate, 53.6 parts titanium dioxide, 2.52 parts manganese carbonate, 6.25 parts magnesium carbonate, and 0.81 part thorium nitrate tetrahydrate.

References Cited in the file of this patent

UNITED STATES PATENTS

| 2,436,839 | Wainer | Mar. 2, 1948 |
| 2,563,307 | Burnham et al. | Aug. 7, 1951 |
| 2,576,378 | Woodcock et al. | Nov. 27, 1951 |
| 2,695,240 | Oshry | Nov. 23, 1954 |
| 2,841,508 | Roup et al. | July 1, 1958 |
| 2,946,937 | Herbert | July 26, 1960 |

FOREIGN PATENTS

| 574,577 | Great Britain | Jan. 11, 1946 |
| 747,716 | Great Britain | Apr. 11, 1956 |
| 1,130,182 | France | Sept. 17, 1956 |